Sept. 19, 1950     D. B. RITCHIE     2,523,144

HANDLE ASSEMBLY

Filed June 3, 1947

Inventor

Duane B. Ritchie

By Clarence A. O'Brien
and Harvey B. Jacobson
Attorneys

Patented Sept. 19, 1950

2,523,144

UNITED STATES PATENT OFFICE 2,523,144

HANDLE ASSEMBLY

Duane B. Ritchie, Lansing, Mich.

Application June 3, 1947, Serial No. 752,129

4 Claims. (Cl. 292—348)

This invention relates to new and useful improvements in handle assemblies and the primary object of the present invention is to provide a safety handle for vehicle doors and the like which can be readily and quickly removed from the door to prevent handling thereof by children during movement of the vehicle.

Another important object of the invention is to provide a handle including novel and improved means for attaching the same to the latching mechanism of the vehicle.

A further object of the present invention is to provide a handle so designed as to permit the same to be removed from a vehicle door thereby preventing unauthorized entrance into a vehicle by use of the handle.

A still further aim of the present invention is to provide a handle that will be readily operable by an adult, but will not be readily perceived or operated by a child, and one that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
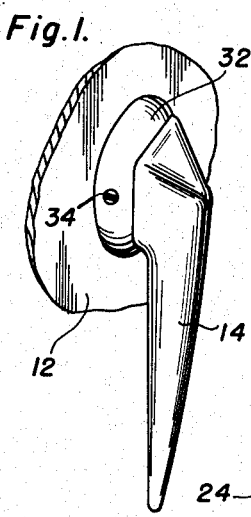
Figure 1 is a fragmentary perspective view of a door with the present handle assembly applied thereto.
Figure 2:
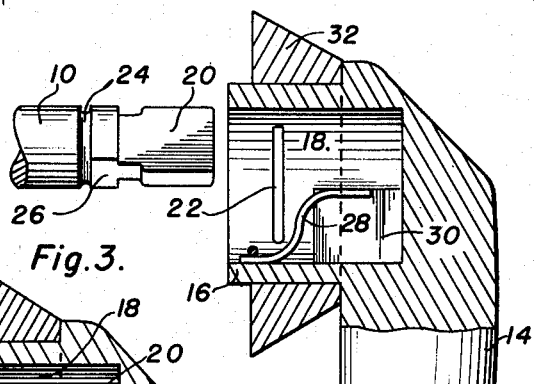
Figure 2 is a group side elevational view of the handle and shaft therefor, with parts of each broken away and shown in section, and showing the handle and shaft in a disengaged position.

Referring now to the drawings in detail, wherein for the purpose of illustration, there is disclosed a preferred embodiment of the present invention, the numeral 10 represents a rotatable shaft that is engaged with the latching mechanism (not shown) of a door 12, preferably a vehicle door, for actuating the latching mechanism to open the door.

A handle or crank member 14 is provided at one end with an angular hub portion 16 preferably of elliptical shape and having a chamber 18 provided therein. The chamber 18 receives the flat integral extension 20 of shaft 10 on the outer terminal portion of said shaft.

Opposed spring arms 22 are secured to the inner wall of the chamber 18 and engage the opposed retaining shoulders of the grooves 24 provided on shaft 10 upon slight rotation of the handle in a counterclockwise direction. Inward from the free end of the extension 20, there is provided a pair of diametrically opposed flat portions 26 that extend to the grooves 24 to permit the insertion of shaft 10 correctly within chamber 18.

Figure 6:
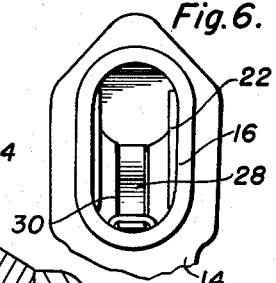
Figure 6 is a fragmentary end elevational view of the handle member.
Figure 5:
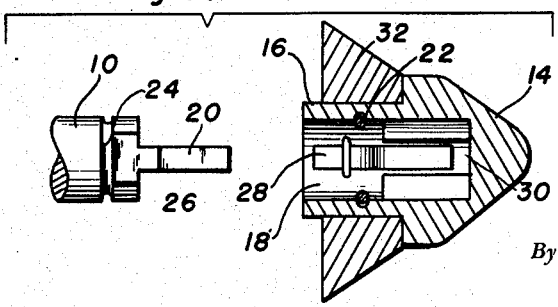
Figure 5 is a group top plan view of the handle and shaft, showing the handle and shaft in a disengaged position, and with parts of the handle and shaft broken away and shown in section.

A leaf spring 28 has one end fixed in the chamber 18, and the free end of this leaf spring engages a groove or recess 30 provided in the chamber 18, as shown best in Figures 5 and 6 of the drawings, for a purpose which will later be more fully apparent.

In practical use of the device, a hub engaging ring 32 is engaged on the hub and is held thereto by a set screw or the like 34 carried by the ring.

Figure 3:
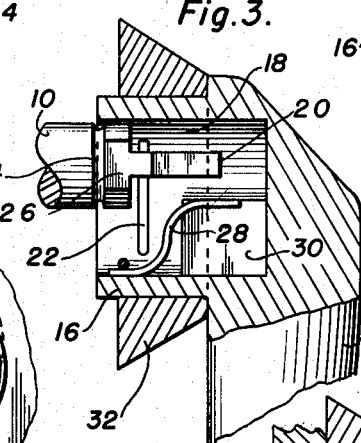
Figure 3 is a fragmentary side elevational view showing the handle in the position for engagement with the shaft, and with parts of the handle and shaft broken away and shown in section.
Figure 7:
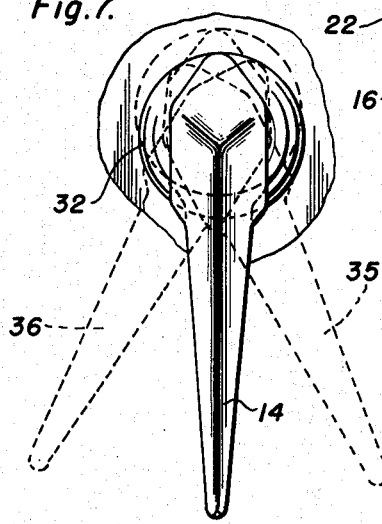
Figure 7 is a front elevational view of the present invention, showing in dotted lines the engaged position and locked position of the handle with the shaft.

The handle is then held at a slight vertical angle, as shown by dotted lines 35 in Figure 7, whereby the flat portions 26 oppose spring arms 22, as shown in Figure 3. In this manner, the handle is loosely engaged with the shaft.

When the handle is rotated downwardly and vertically, spring arms 22 engage the retaining grooves 24 holding the handle to the shaft but not fixed thereto, as shown in full lines in Figure 7.

Figure 4:
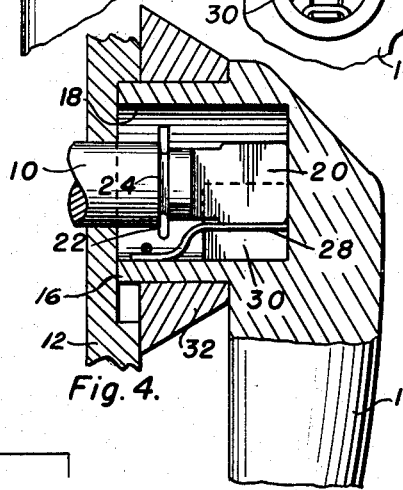
Figure 4 is a fragmentary side elevational view showing the handle in a fixed or locked position to the shaft for rotating the latter, with parts of the handle and shaft broken away and shown in section, and with parts of the door panel shown in section with the hub portion of the crank handle engaged in a recess formed in the door panel.

As the handle is again rotated in a clockwise direction to a slight vertical angle and pushed upwardly, as shown by dotted lines 36 of Figure 7, one edge of the extension 20 is urged against the free end of the spring arm 28 and the extension 20 is engaged in the recess 30, as shown in Figure 4, tightly engaging the hande with the shaft for clockwise rotation of the shaft by the handle to actuate the latching mechanism.

Obviously, the handle may also be attached to the shaft in a counterclockwise direction without deviating from the scope of the present invention.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. In a door latch, a rotatable shaft, a crank having an opening therein to receive said shaft, means carried by said crank and disposed within said opening for detachably engaging said shaft upon a slight rotation of the crank in one direction and an axial movement of the crank relative to the shaft, an extension integrally formed with said shaft, and a recess provided in the walls of said opening for tightly receiving said extension to lock the crank to the shaft for rotation of the same together upon continued rotation of said crank in the same direction and a lateral movement of the crank with respect to the shaft.

2. In a door latch, a rotatable shaft engageable with the latching mechanism of a door, a crank having a hub portion, a chamber in said hub portion for receiving said shaft, opposed spring arms mounted within said chamber, opposed retaining shoulders on said shaft for engaging said spring arms upon an axial movement of the crank relative to the shaft, flat portions on said shaft extending to said shoulders and permitting disengagement of the spring arms with said shoulders, said shaft having a flat end portion received in said chamber, and a recess provided in the walls of said chamber receiving said flat end portion upon a lateral movement of the crank with respect to the shaft to lock the crank to the shaft.

3. In a door latch, a rotatable shaft engageable with the latching mechanism of a door, a crank having an opening therein for receiving said shaft, a resilient means carried by the inner wall of the opening at opposite sides thereof, an annular retaining groove provided on said shaft and yieldingly receiving said resilient means upon rotation of said crank in one direction and upon an axial movement of the crank during its rotation, a recess provided in the wall of said opening engageable with a portion of said shaft upon lateral movement of the crank with respect to the shaft to lock the crank relative to the shaft for rotation of the same together, and further resilient means mounted in said opening and urging said crank out of locking engagement with said shaft.

4. The combination of claim 1 and a spring member mounted in said opening and having a portion disposed in said recess and acting upon said extension to urge said crank out of locking engagement with said shaft.

DUANE B. RITCHIE.

REFERENCES CITED

The following references are of record in the file of this patent:

UNITED STATES PATENTS

| Number | Name | Date |
| --- | --- | --- |
| 177,877 | Niles | May 23, 1876 |
| 1,463,341 | Somers | July 31, 1923 |
| 1,951,188 | Flaherty | Mar. 13, 1934 |
| 2,329,379 | Anderson | Sept. 14, 1943 |